United States Patent

[11] 3,623,038

[72] Inventors Dennis M. Franklin
Randolph;
Richard M. Hornreich, Sudbury; Harvey
Rubinstein, Lynnfield, all of Mass.
[21] Appl. No. 886,474
[22] Filed Dec. 19, 1969
[45] Patented Nov. 23, 1971
[73] Assignee GTE Sylvania Incorporated

[54] PHERAL LAYER MAGNETIC THIN FILM ELEMENT
16 Claims, 19 Drawing Figs.

[52] U.S. Cl. ....................340/174 TF, 340/174 QA, 340/174 PC
[51] Int. Cl. .................... G11c 11/14
[50] Field of Search .................... 340/174 TF

[56] References Cited
UNITED STATES PATENTS

| | | | |
|---|---|---|---|
| 3,524,173 | 8/1970 | Wolf | 340/174 |
| 3,432,828 | 3/1969 | Barker et al. | 340/174 |

*Primary Examiner*—Stanley M. Urynowicz, Jr.
*Attorneys*—Norman J. O'Malley, Elmer J. Nealon and Peter Xiarhos

ABSTRACT: A multilayer magnetostatically coupled thin-film magnetic memory device comprising first and second magnetic films having a conducting layer and a smoothing layer therebetween. Each of the magnetic films includes a pair of small shaped tab portions, one at each end region of the film, for preventing the undesirable formation during normal current disturb conditions of parasitic (or "reverse") magnetic domains in the portions of the films disposed above and below the conducting layer. In a first form of the tab portions in accordance with the invention, the tab portions have a tapered-tip geometry and serve to prevent completely the formation of parasitic magnetic domains anywhere within the magnetic films. In an alternative form of the tab portions in accordance with the invention, the tab portions have a rectangular geometry and parasitic magnetic domains are formed in the magnetic films. However, the parasitic magnetic domains are formed only in the rectangular tab portions and not in the portions of the magnetic films disposed above and below the conducting layer. Since the portions of the magnetic films disposed above and below the conducting layer are the only portions affected by magnetic fields (produced by current flow through the conducting layer), the parasitic magnetic domains present in the rectangular tab portions do not lead to a loss of information stored in the magnetic films.
An alternative multilayer magnetostatically coupled thin-film magnetic memory device having no smoothing layer is also disclosed.

PRIOR ART

*INVENTORS*
DENNIS M. FRANKLIN
RICHARD M. HORNREICH
HARVEY RUBINSTEIN

*INVENTORS*
DENNIS M. FRANKLIN
RICHARD M. HORNREICH
HARVEY RUBINSTEIN

*INVENTORS*
DENNIS M. FRANKLIN
RICHARD M. HORNREICH
HARVEY RUBINSTEIN

*INVENTORS*
DENNIS M. FRANKLIN
RICHARD M. HORNREICH
HARVEY RUBINSTEIN

PHERAL LAYER MAGNETIC THIN FILM ELEMENT

BACKGROUND OF THE INVENTION

The present invention relates to thin-film magnetic devices, and, more particularly, to magnetostatically coupled thin-film magnetic memory devices.

Magnetostatically coupled thin-film magnetic memory devices, also commonly referred to as "coupled-film" or "-closed-flux" devices, are well known to those skilled in the art. The advantages offered by magnetostatically coupled thin-film magnetic devices, namely, smaller memory cell or device size, greater signal amplitudes, and higher packing density, are also well known to those skilled in the art. A typical magnetostatically coupled thin-film magnetic memory device, as suggested by the prior art, includes a pair of magnetic films, for example, vacuum-deposited Permalloy or Cobalt-Permalloy (ternary alloy) films, separated by a vacuum-deposited conducting layer, for example, a write-sense conducting layer, having a reasonably low resistivity (high conductivity). Some materials having reasonably low resistivity values which have been suggested for use as conducting layers in magnetostatically coupled thin-film devices of the above type include copper, silver, gold, and aluminum.

As an improved version of the three-layer device briefly described above, it has been suggested in the prior art to separate the two magnetic films by a conducting layer having a reasonably low resistivity, and a smoothing layer directly overlying the conducting layer of a material such as silicon monoxide, titanium, or molybdenum. The smoothing layer serves in known fashion to alleviate large-grain growth and surface roughness problems associated with the use of a conducting layer of pure copper, silver, gold, or aluminum, by smoothing out the peaks and filling in the valleys of the top surface of the conducting layer thereby providing a reasonably smooth surface on which the upper magnetic film can be deposited. As is well known, as a result of using a smoothing layer in conjunction with the conducting layer, the static magnetic properties of the upper magnetic film, such as skew ($\beta$), wall-motion coercive force ($H_c$), angular dispersion ($\alpha_{90}$), and anisotropy field ($H_k$), are made to have reasonable, acceptable values for many memory applications, these values being more nearly equal to the static magnetic properties of the bottom magnetic film.

The above-described magnetostatically coupled thin-film magnetic memory devices, particularly the devices including smoothing layers, have been generally capable of reasonably satisfactory operation. However, to produce these devices, it has been necessary heretofore to exercise great care in the selection of the materials to be used in fabricating the devices and also to exercise careful supervision and control over the fabrication process to insure that the proper, required values of the properties of the materials are achieved, particularly the values of wall-motion and wall-creep thresholds, and the values of the aforementioned static magnetic properties of the magnetic films (skew, wall-motion, coercive force, angular dispersion, and anisotropy field). Experience has indicated that the production of magnetic films having the particular values of wall-motion and wall-creep thresholds as well as the particular values of static magnetic properties required for effective operation in multilayer magnetostatically coupled thin-film structures is very difficult to realize due to the many demands placed on the magnetic properties of the films, in particular, their wall-motion and wall-creep thresholds, which tend to be lower in magnetostatically coupled thin-film devices. In those magnetostatically coupled thin-film devices in which the required values of wall-motion and wall-creep thresholds and the required values of the static magnetic properties of the magnetic films have not been satisfactorily achieved, the condition has primarily manifested itself by the undesirable growth of parasitic (or reverse) magnetic domains in the magnetic films during certain normal current disturb conditions, for example, during writing operations associated with adjacent devices or cells sharing the same write-sense conducting layer. The effect of current disturb conditions on the magnetic films, particularly repetitive current disturb conditions, is to cause the parasitic magnetic domains to gradually grow in size and cause a reversal of the magnetization in parts of the magnetic films, thereby resulting in a decrease in the amplitude of signals during readout, or, even worse, to cause a complete reversal of the magnetizations in the films, thereby resulting in a complete reversal or loss of the information (binary "one" or binary "zero") stored in the films.

BRIEF SUMMARY OF THE INVENTION

Briefly, in accordance with the present invention, a multilayer thin-film magnetic device is provided in accordance with a first embodiment which overcomes many of the problems and difficulties associated with prior art devices. The multilayer thin-film magnetic device of the first embodiment includes a first magnetic film including tab portions, a second magnetic film including tab portions, and a conducting layer and a smoothing layer disposed between the first and second magnetic films. The first and second magnetic films are arranged such that the first magnetic film is positioned below the conducting layer and the second magnetic film is positioned above the conducting layer. The tab portions included in the first magnetic film are geometrically shaped and positioned relative to the remainder of the film so as to eliminate nucleation sites for parasitic magnetic domains in the portion of the film underlying the conducting layer thereby preventing the formation of parasitic magnetic domains in the portion of the film underlying the conducting layer. In a similar fashion, the tab portions included in the second magnetic film are geometrically shaped and positioned relative to the remainder of the film so as to eliminate nucleation sites for parasitic magnetic domains in the portion of the film overlying the conducting layer thereby preventing the formation of parasitic magnetic domains in the portion of the film overlying the conducting layer.

In a first form of the tab portions in accordance with the invention, the tab portions have a tapered-tip geometry and serve to prevent completely the formation of parasitic magnetic domains anywhere within the films. In an alternative form of the tab portions in accordance with the invention, the tab portions have a rectangular geometry and parasitic magnetic domains are formed in the magnetic films, however, only in the rectangular tab portions and not in the portions of the magnetic films overlying and underlying the conducting layer. Since the portions of the magnetic films overlying and underlying the conducting layer are the only portions affected by magnetic fields produced by current flow through the conducting layer, the parasitic magnetic domains present in the rectangular tab portions do not lead to a loss of information stored in the magnetic films.

By employing magnetic films including tab portions in accordance with the present invention, the demands placed on the magnetic properties of the films, such as wall-motion and wall-creep thresholds, are fewer than heretofore and, as a result, the overall requirements that the films must satisfy for effective operation are reduced and the overall design of thin-film devices utilizing the films is simplified. Thus, magnetic films having tab portions in accordance with the present invention may have magnetic properties previously considered unacceptable.

An alternative multilayer thin-film magnetic device having no smoothing layer is also provided in accordance with the present invention as will be described fully hereinafter.

DETAILED DESCRIPTION OF THE INVENTION

Figure 1:
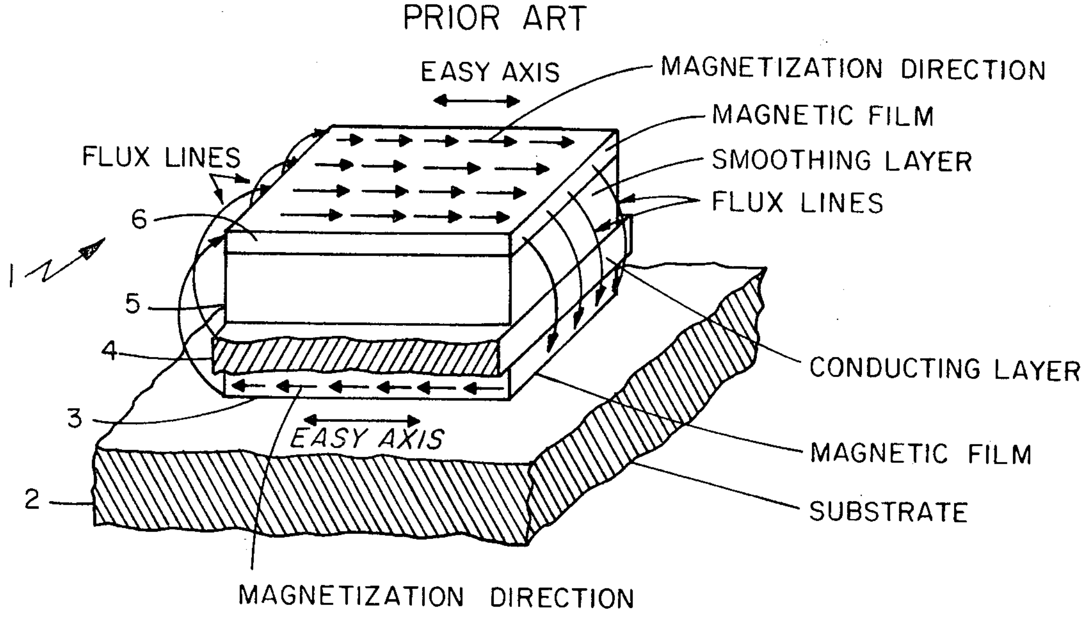
FIG. 1 is a perspective view, partly in cross section, of a typical prior art magnetostatically coupled thin-film magnetic memory device disposed on a substrate and including lower and upper magnetic films having their easy axes of magnetization parallel to the long dimensions of the films.

Prior Art Magnetostatically Coupled Thin-Film Device—FIG. 1

Referring now to FIG. 1, there is shown a typical prior art magnetostatically coupled thin-film magnetic memory device 1 disposed on a substrate 2. As shown in FIG. 1, the prior art magnetostatically coupled thin-film magnetic memory device 1 comprises, in succession, a first magnetic film 3, a conducting strip or layer 4, for example, a write-sense conducting layer, a smoothing layer 5, and a second magnetic film 6. By way of a specific example, the substrate 2 may be glass or quartz, the first magnetic film may be a vacuum-deposited Permalloy or Cobalt-Permalloy material having a thickness of 1,000 A., the conducting layer 4 may be a vacuum-deposited layer of copper having a thickness of 1–2 microns, the smoothing layer 5 may be a vacuum-deposited layer of silicon monoxide having a thickness of 2–4 microns, and the second magnetic film 6 may be a vacuum-deposited Permalloy or Cobalt-Permalloy material having a thickness of 1,000 A. Although not indicated in FIG. 1, an additional conducting layer may be provided above the upper magnetic film 6 and insulated therefrom, for use as a half-select line in certain types of coincident-current memories, the conducting layer 4 constituting the other half-select line.

As indicated in FIG. 1, the easy axes of magnetization of the magnetic films 3 and 6 are established to be parallel to the long dimensions or long edges of the films. As also indicated in FIG. 1, the magnetizations in the magnetic films 3 and 6 are established to be parallel to the easy axes of the films and to lie in opposite directions, that is, the magnetizations in the films are antiparallel. As is well understood, the antiparallel magnetizations in the two magnetic films cause magnetic flux lines to couple the end regions of the two magnetic films and to thereby provide a continuous, closed-loop flux path, as indicated in FIG. 1. As is also well known, the two magnetic films, when operating as described above, serve to jointly store a particular bit of information, for example, a binary "one." To store a binary "zero," it is necessary only to reverse the directions of magnetizations in the two magnetic films from the directions indicated in FIG. 1.

Although the above-described prior art device 1 is generally capable of reasonably satisfactory operation, to produce such a device requires the exercise of great care in the selection of the materials to be used, particularly the materials of the magnetic films, and also careful supervision and control over the fabrication process to insure that the proper, required values of the properties of the materials are achieved, particularly the values of the wall-motion and wall-creep thresholds and the values of the static magnetic properties of the magnetic films (such as skew, wall-motion, coercive force, angular dispersion, and anisotropy field). Experience has indicated that the above approach is generally unreliable because of the difficulty in selecting suitable magnetic materials and controlling their properties so as to produce magnetic films having the specific wall-motion and wall-creep thresholds required for effective operation in a magnetostatically coupled thin-film structure, these thresholds generally having lower values in magnetostatically coupled thin-film structures than in single-film structures, as well as the required static magnetic properties. Because of the above-mentioned difficulties, many magnetic films have been produced in accordance with the above approach which have been characterized by the undesirably formation and growth of parasitic magnetic domains during repeated current disturb conditions, and have often led to a partial or complete loss of the binary information stored in the films.

Figure 2A:
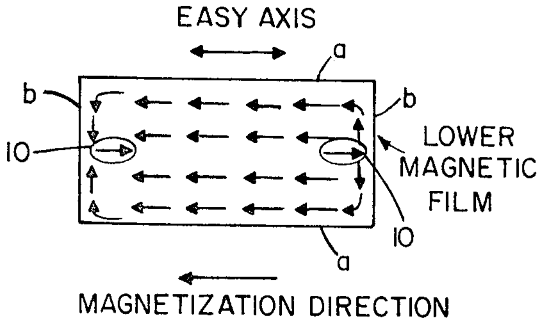
FIGS. 2*a* and 2*b* are top views, respectively, of lower and upper magnetic films of a magnetostatically coupled thin-film magnetic memory device fabricated in accordance with prior art techniques wherein the magnetic films have undesirable magnetic properties, illustrating the manner in which parasitic magnetic domains are formed in the films.
Figure 2B:
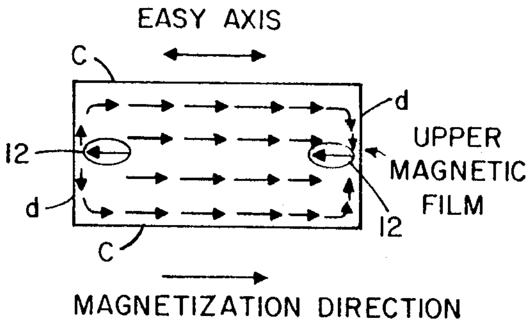

FIGS. 2*a* and 2*b* illustrate the manner in which parasitic magnetic domains may be formed in lower and upper magnetic films of a magnetostatically coupled thin-film device wherein the magnetic films do not have the particular magnetic properties required for effective operation. During certain current disturb conditions, for example, in writing information into adjacent cells or devices sharing the same write-sense conducting layer, the magnetizations in the lower and upper magnetic films are parallel to each other and in opposite directions, that is, antiparallel, as in the manner previously described in connection with the prior art magnetostatically coupled thin-film device 1 of FIG. 1. This antiparallel state of the magnetizations in the lower and upper magnetic films serves to inhibit the nucleation of unwanted domains near the long edges of the films, that is, the edges *a* of the lower magnetic film (FIG. 2*a*) and the edges *c* of the upper magnetic film (FIG. 2*b*), and to reduce the magnetic interaction between adjacent domains formed along these edges. However, in magnetic films having the particular geometry of the magnetic films shown in FIGS. 2*a* and 2*b*, a pair of parasitic magnetic domains form in each film at opposite end regions thereof due to the necessity for the magnetization in each film to be parallel to the edges (short edges) at the end regions. As shown in FIG. 2*a* a pair of tear-shaped parasitic magnetic domains 10 each having a magnetization direction opposite to the principal magnetization direction in the film are formed near the short sides, designated *b*, of the lower magnetic film near the center of the sides *b*. Similarly, as shown in FIG. 2*b*, a pair of tear-shaped parasitic magnetic domains 12 also having a magnetization direction opposite to the principal magnetization direction in the film are formed near the short sides, designated *d*, of the lower magnetic film near the center of the sides *d*. As previously described, with repeated current disturb conditions, the parasitic magnetic domains 10 and 12 formed in the lower and upper magnetic films may grow in size and may reach a size sufficiently great as to cause a partial reversal of the magnetizations in the films, thereby leading to a reduced signal amplitude during subsequent readout (sense mode of operation), or, if the parasitic magnetic domains become very large, a complete loss or reversal of the binary information stored in the films.

DESCRIPTION OF THE INVENTION

Magnetostatically Coupled Thin-film Magnetic Memory Device

First Embodiment—FIGS. 3–7*b*, 9*a*–11

The present invention solves the above-described problems with parasitic magnetic domains by employing magnetic films having tab portions or protrusions at opposite end regions thereof serving either to prevent completely the formation of parasitic magnetic domains within the films or permitting parasitic magnetic domains to form in the films but not in the portions of the films influenced by current disturb conditions, that is, the portions of the films overlying or underlying the conducting layer. As mentioned previously, the use of magnetic films having tab portions in accordance with the present invention is in no way dependent on the magnetic properties of the films and reduces the overall requirements that the magnetic films must satisfy for effective operation in magnetostatically coupled thin-film devices, thereby simplifying the overall design of magnetostatically coupled thin-film devices. Thus, the magnetic films having tab portions in accordance with the present invention may have magnetic properties previously considered unacceptable, as previously discussed.

Figure 3:
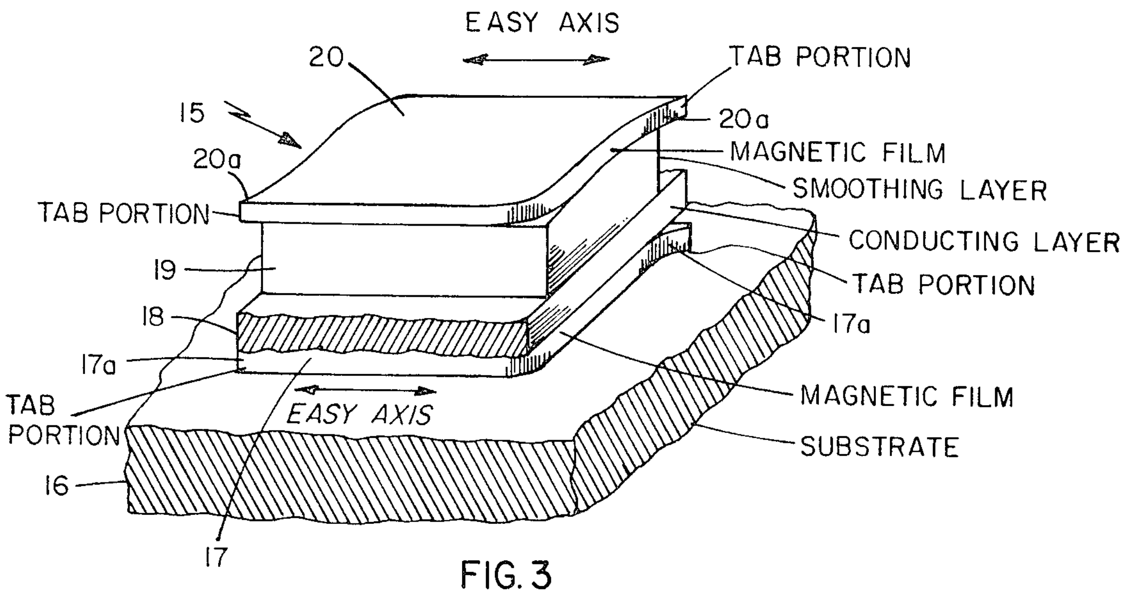
FIG. 3 is a perspective view, partly in cross section, of a magnetostatically coupled thin-film magnetic memory device disposed on a substrate in accordance with a first embodiment of the invention, including lower and upper magnetic films having their easy axes of magnetization parallel to the long dimensions of the films and including tab portions at opposite end regions thereof for preventing the formation of undesirable parasitic magnetic domains anywhere in the magnetic films during certain current disturb conditions.
Figures 4A, 4B:
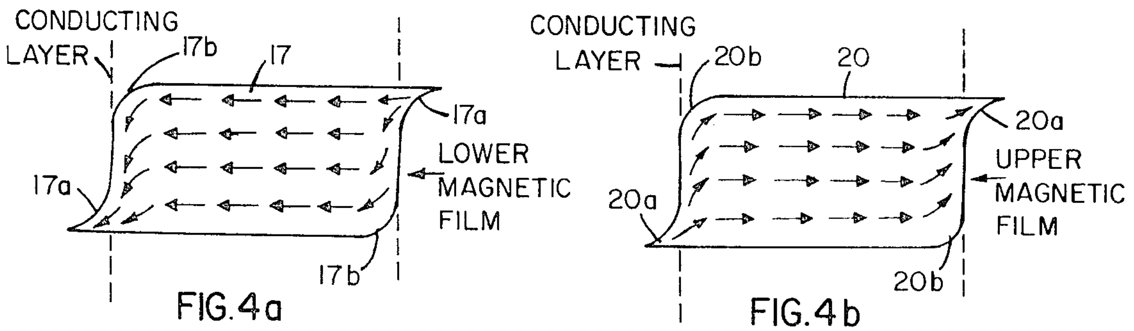
FIGS. 4*a* and 4*b* are top views, respectively, of the lower and upper magnetic films included in the magnetostatically coupled thin-film magnetic memory device of FIG. 3, showing the manner in which the formation of undesirable parasitic magnetic domains is prevented.

Referring now to FIG. 3, there is shown a magnetostatically coupled thin-film magnetic memory device 15 disposed on a substrate 16 in accordance with a first embodiment of the invention. As shown in FIGS. 3, 4*a*, and 4*b*, the magnetostatically coupled thin-film magnetic memory device 15 includes, in succession, a first (lower) magnetic film 17 having a pair of tab portions **17*a*** at opposite end regions thereof and at diagonally opposed corners, as shown more clearly in FIG. 4*a*, a conducting layer 18, for example, a write-sense conducting layer, a smoothing layer 19, and a second (upper) magnetic film 20 having a pair of tab portions **20*a* at opposite end regions thereof and at diagonally opposed corners. By way of example, the magnetic films 17 and 20, the conducting layer 18, and the smoothing layer 19 may be of the same materials and have the same thicknesses as the corresponding elements comprising the prior art magnetostatically coupled thin-film device 1 of FIG. 1**. The principal difference, therefore, is the use of the present invention of magnetic films including tab portions.

As indicated in FIGS. 4*a* and 4*b*, the tab portions **17*a* of the lower magnetic film 17 and the tab portions 20*a* of the upper magnetic film 20 each have a tapered-tip geometry or configuration. This particular tapered-tip geometry for the tab portions 17*a* and 20*a* serves to prevent entirely the formation of parasitic magnetic domains anywhere within the films 17 and 20 by altering the basic rectangular parallelogram geometry of the magnetic films 17 and 20** at the end regions thereof to eliminate the existence of boundary conditions or geometries, such as 90° corners, encouraging magnetic flux lines in the films to meet head on and to form undesirable parasitic magnetic domains, in the manner indicated in FIGS. 2*a* and 2*b*. In other words, nucleation sites for parasitic magnetic domains are eliminated. It is evident, therefore, that with the particular geometries of the magnetic films 17 and 20 shown in FIGS. 4*a* and 4*b*, having no 90° corners, and since the magnetizations in the films must lie parallel to the boundaries or edges of the films, there is no way in which parasitic magnetic domains are able to form.

As also indicated in FIGS. 4*a* and 4*b*, the corners of the magnetic films 17 and 20 not having tab portions associated therewith, designated in FIGS. 4*a* and 4*b* as **17*b* and 20*b*, respectively, are preferably rounded to encourage the magnetic flux lines in the films at these corner regions to lie along preferred curved paths rather than straight-line paths thereby preventing the formation of domain walls in the corners. It is to be noted, however, that the rounding of the corners 17*b* and 20*b*** is not absolutely necessary inasmuch as domain walls formed in these corners have no noticeable adverse effect on the performance of the magnetic films.

Figures 6A, 6B, 7A, 7B:
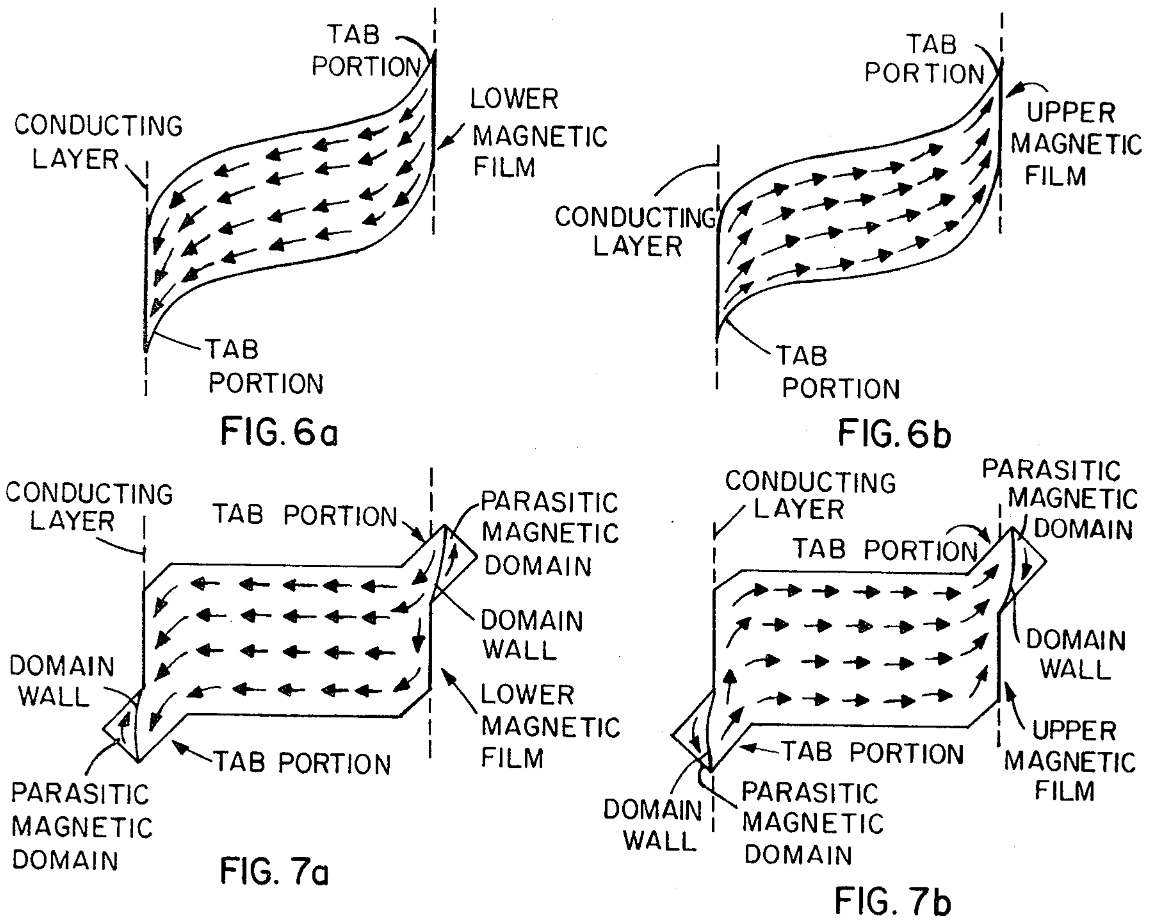
FIGS. 5*a* and 5*b*, and 6*a* and 6*b*, are top views of lower and upper magnetic films including tab portions of different shapes and locations than in FIGS. 4*a* and 4*b* which may alternatively be employed in the magnetostatically coupled thin-film magnetic memory device of FIG. 3.
FIGS. 7*a* and 7*b* are top views, respectively, of still other forms of lower and upper magnetic films which may be employed alternatively in the magnetostatically coupled thin-film magnetic memory device of FIG. 3, the lower and upper magnetic films including tab portions having shapes and locations permitting the formation of parasitic magnetic domains in the films but not in the portions of the magnetic films influenced by current disturb conditions.
Figures 5A, 5B:
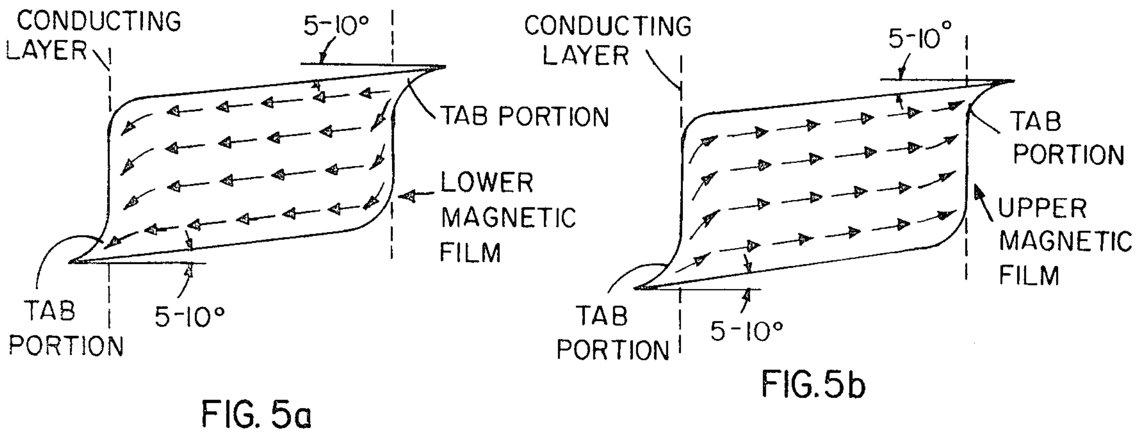

Although the particular geometries of the magnetic films 17 and 20 shown in FIGS. 4*a* and 4*b* are entirely suitable for use in the magnetostatically coupled thin-film device 15 of FIG. 3, it is to be appreciated that other geometries of magnetic films, such as shown in FIGS. 5*a* and 5*b*, 6*a* and 6*b*, 7*a* and 7*b*, may also be used. FIGS. 5*a* and 5*b* illustrate lower and upper magnetic films, respectively, of a generally rhomboid parallelogram geometry. The long sides slope at angles of 5° to 10°, and the tab portions are slightly narrower, slightly longer and more sharply tapered than the tapered-tip tab portions of the magnetic films of FIGS. 4*a* and 4*b*. FIGS. 6and 6*b* illustrate lower and upper magnetic films, respectively, having steeply sloping slightly curved long sides, slightly curved short sides, and tab portions which lie over or under the conducting layer rather than extending in directions away from the conducting layer as in the case of the magnetic films shown in FIGS. 4*a* and 4*b*, and 5*a* and 5*b*. Since the magnetic films shown in FIGS. 5*a* and 5*b*, and FIGS. 6*a* and 6*b*, operate in essentially the same manner as the magnetic films shown in FIGS. 4*a* and 4*b* to prevent the formation of parasitic magnetic domains in the films, as indicated by the magnetizations patterns of the magnetic films of FIGS. 5*a* and 5*b*, and 6*a* and 6*b*, no further discussion is believed necessary.

FIGS. 7*a* and 7*b* illustrate upper and lower magnetic films, respectively, having multisided tab portions, for example, rectangular tab portions, at obtuse angles to the long dimensions of the films. The magnetic films of FIGS. 7*a* and 7*b* differ most significantly from the previously described magnetic films in that parasitic magnetic domains are actually permitted to form in the magnetic films of FIGS. 7*a* and 7*b*. However, as indicated in FIGS. 7*a* and 7*b*, the parasitic magnetic domains form only in the multisided tab portions and not in the portions of the magnetic films disposed above or below the conducting layer. Since the portions of the magnetic films disposed above and below the conducting layer are the only portions affected by magnetic fields, for example, due to current flow through the conducting layer during writing operations, the parasitic magnetic domains formed in the rectangular tab portions have no adverse effect on the principal magnetization states of the two magnetic films. It is to be noted that during the formation of the parasitic magnetic domains, corresponding domain walls are formed in the rectangular tab portions. However, these domain walls do not cause any noticeable adverse effects on the performances of the magnetic films. It may also be noted that the magnetic films of FIGS. 7*a* and 7*b* each have a geometry formed entirely of straight-line segments and that the corners not having tab portions associated therewith are cut away instead of being rounded off as in the cases of the magnetic films shown in FIGS. 4*a*–6*b*. This particular geometry for the magnetic films may be preferred in certain cases for simplifying the generation of masks for use in producing the magnetic films, straight-line segments generally being easier to produce in masks than curved-line segments. By the same token, the curved portions of the various magnetic films shown in FIGS. 4*a* and 4*b*, 5*a* and 5*b*, and 6*a* and 6*b* may be approximated in the generation of masks by straight-line segments.

Figure 8A:
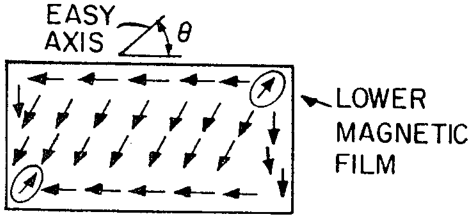
FIGS. 8*a* and 8*b* are top views, respectively, of lower and upper magnetic films of a magnetostatically coupled thin-film magnetic memory device fabricated in accordance with prior art techniques, the magnetic films having undesirable magnetic properties and easy axes of magnetization at angles to the long dimensions of the films, and showing the manner in which parasitic magnetic domains are formed in the films.
Figure 8B:
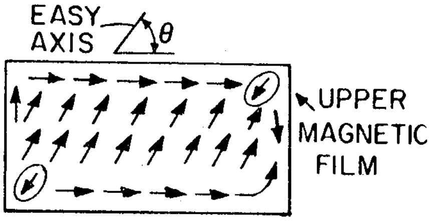

The discussion to this point has been directed to magnetic films having their easy axes of magnetizations parallel to the long dimensions of the films. However, magnetic films having tab portions may also be used where the easy axes of magnetization of the films are at angles to the long dimensions of the films. To illustrate the problems with parasitic magnetic domains occurring in lower and upper magnetic films of a magnetostatically coupled thin-film magnetic memory device fabricated by prior art techniques in which the axes of magnetization of the films are at angles $\theta$ (e.g., 45°) to the long dimensions of the films and the magnetic properties of the films are undesirable, reference may be made to FIGS. 8*a* and 8*b*. As indicated in FIGS. 8*a* and 8*b*, parasitic magnetic domains form in the corners of the films due to the necessity for the magnetization to be parallel to the film edges immediately adjacent to the film sides. To eliminate the effects of parasitic magnetic domains in the above situation, lower and upper magnetic films such as previously discussed and shown in FIGS. 4*a* and 4*b*, 5*a* and 5*b*, 6*a* and 6*b*, or alternatively, as shown in FIGS. 9*a* and 9*b*, may be used.

Figure 9A:
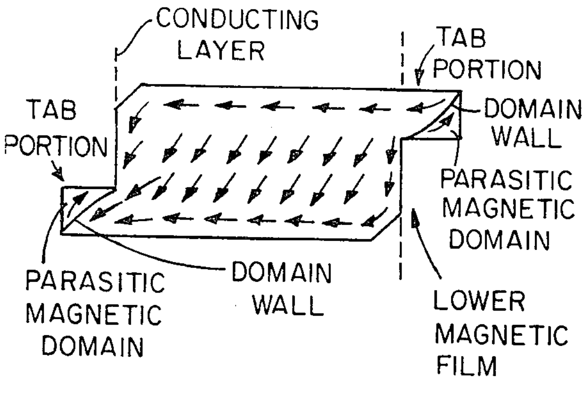
FIGS. 9*a* and 9*b* are top views, respectively, of lower and upper magnetic films which may be employed in accordance with the present invention to eliminate the effects of parasitic magnetic domains in films such as shown in FIGS. 8*a* and 8*b*, the magnetic films having their easy axes of magnetization at angles to the long dimensions of the films and including tab portions having shapes and locations permitting the formation of parasitic magnetic domains in the magnetic films but not in the portions of the magnetic films that are influenced by current disturb conditions.
Figure 9B:
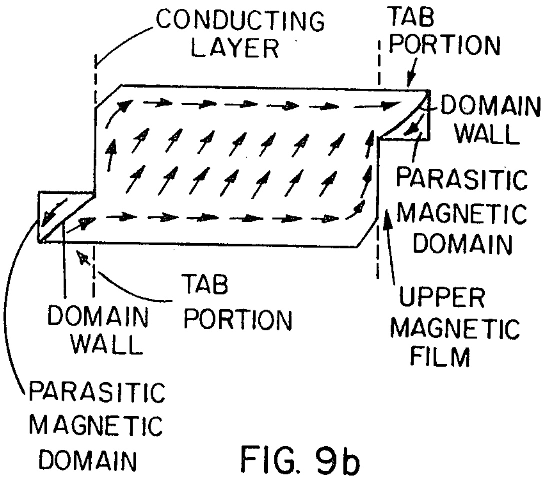

As shown in FIGS. 9*a* and 9*b*, each of the magnetic films includes a pair of multisided tab portions of the type shown in FIGS. 7*a* and 7*b*, , *but the tab portions are normal to the short dimensions of the films. In this case, parasitic magnetic domains are permitted to form but, as in the case of the magnetic films of FIGS.* 7*a* and 7*b*, the parasitic domains form in the multisided tab portions and not in the portions of the films overlying and underlying the conducting layer influenced by current disturb conditions. Domain walls are also formed in the multisided tab portions as in the case of the tab portions in the magnetic films of FIGS. 7*a* and 7*b*, but, again, these domain walls cause no noticeable adverse effects on the performances of the magnetic films.

Figure 10:
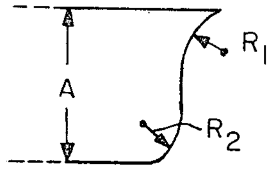
FIG. 10 illustrates an end region of a magnetic film such as shown in each of FIGS. 4*a* and 4*b*, indicating principal dimensions of the end region.
Figure 11:
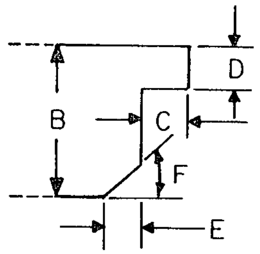
FIG. 11 illustrates an end region of a magnetic film such as shown in each of FIGS. 9*a* and 9*b*, indicating principal dimensions of the end region.

Some exemplary values of dimensions for end regions of two of the magnetic films discussed hereinabove may be given, specific reference being made to FIGS. 10 and 11. FIG. 10 illustrates and end region of a magnetic film such as shown in FIG. 4*a* or FIG. 4*b*, and FIG. 11 illustrates and end region of a magnetic film such as shown in FIG. 9*a* or FIG. 9*b*. In FIG. 10, the dimension A may have a value of 5–20 mils, and each of the dimensions $R_1$ and $R_2$ (radii) may have a value of ½–2 mils. In FIG. 11, the dimensions B, C, D, and E may have values of 0.010 inch, 0.003 inch, 0.0015 inch, and 0.003 inch, respectively, and the angle F may have a value of 45°.

Magnetostatically Coupled Thin-Film Magnetic Memory Device

Figure 12:
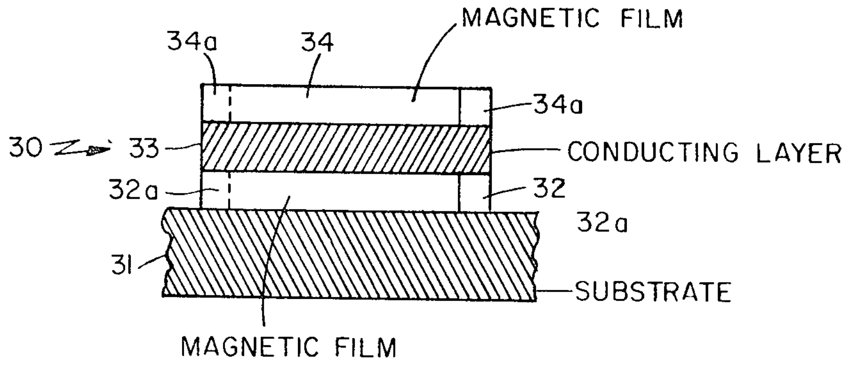
FIG. 12 is a side elevational view, partly in cross section, of a magnetostatically coupled thin-film magnetic memory device in accordance with an alternative embodiment of the invention.

Alternative Embodiment—FIG. 12

Referring now to FIG. 12, there is shown in a front elevational view, partly in cross section, a multilayer magnetostatically coupled thin-film magnetic memory device 30 disposed on a substrate 31 in accordance with an alternative embodiment of the invention. As shown in FIG. 12, the magnetostatically coupled thin-film device 30 comprises, in succession, a first magnetic film 32 having a pair of tab portions 32*a* (shown schematically), a conducting layer 33, for example, a write-sense conducting layer, and a second magnetic film 34 having a pair of tab portions 34*a* (also shown schematically). The magnetic films 32 and 34 may each have any one of the various geometrical configurations shown in FIGS. 4*a* and 4*b*, 5*a* and 5*b*, 6*a* and 6*b*, 7*a* and 7*b*, and 9*a* and 9*b*. It is apparent, therefore, that the multilayer magnetostatically coupled thin-film device 30 of FIG. 12 differs most significantly from the multilayer magnetostatically coupled thin-film device 15 of FIG. 3 in that no smoothing layer is employed in the device 30. By way of a specific example, the substrate 31 may be glass or quartz, the first magnetic film 32 may be a vacuum-deposited magnetostrictive or nonmagnetostrictive Permalloy material having a thickness of 2,000 A., the conducting layer 33 may be a vacuum-deposited layer of copper having a thickness of 3,000 A., and the second magnetic film may be a vacuum-deposited magnetostrictive or nonmagnetostrictive Permalloy material having a thickness of 2,000 A.

We claim:

1. A multilayer thin-film magnetic device including:

a first magnetic film having first and second pairs of opposed sides defining first and second pairs of diagonally opposed corner regions and having an easy axis of magnetization parallel to one of the sides, said first magnetic film including a tab portion at each of the corner regions of one of the pairs of diagonally opposed corner regions, the other one of the pairs of diagonally opposed corner regions lacking tab portions;

a second magnetic film having first and second pairs of opposed sides defining first and second diagonally opposed corner regions and having an easy axis of magnetization parallel to one of the sides, said second magnetic film including a tab portion at each of the corner regions of one of the pairs of diagonally opposed corner regions, the other one of the pairs of diagonally opposed corner regions lacking tab portions; and a conducting layer and a smoothing layer disposed between the first and second magnetic films, the first magnetic film being positioned below the conducting layer and the second magnetic film being positioned above the conducting layer;

the tab portions included in the first magnetic film being geometrically shaped so as to eliminate nucleation sites for parasitic magnetic domains in the portion of the film underlying the conducting layer thereby preventing the formation of parasitic magnetic domains in the portion of the film underlying the conducting layer; and the tab portion included in the second magnetic film being geometrically shaped so as to eliminate nucleation sites for parasitic magnetic domains in the portion of the film overlying the conducting layer thereby preventing the formation of parasitic magnetic domains in the portion of the film overlying the conducting layer.

2. A multilayer thin-film magnetic device in accordance with claim 1 wherein:

the first magnetic film has a generally parallelogram configuration and the associated tab portions extend in a direction away from the conducting layer so as not to underlie the conducting layer; and the second magnetic film has a generally parallelogram configuration and the associated tab portions extend in a direction away from the conducting layer so as not to overlie the conducting layer.

3. A multilayer thin-film magnetic device in accordance with claim 2 wherein:

the first magnetic film has a generally rectangular configuration and each of the tab portions has a tapered-tip configuration; and the second magnetic film has a generally rectangular configuration and each of the tab portions has a tapered-tip configuration.

4. A multilayer thin-film magnetic device in accordance with claim 2 wherein:

the first magnetic film has a generally rhomboid configuration and each of the tab portions has a tapered-tip configuration; and the second magnetic film has a generally rhomboid configuration and each of the tab portions has a tapered-tip configuration.

5. A multilayer thin-film magnetic device in accordance with claim 2 wherein:

the first magnetic film has a generally rectangular configuration, and each of the tab portions has a rectangular configuration, the rectangular tab portions permitting the formation of parasitic magnetic domains in the film but only in the rectangular tab portions and not in the portion of the film underlying the conducting layer; and the second magnetic film has a generally rectangular configuration and each of the tab portions has a rectangular configuration, the rectangular tab portions permitting the formation of parasitic magnetic domains in the film but only in the rectangular tab portions and not in the portion of the film overlying the conducting layer.

6. A multilayer thin-film magnetic device in accordance with claim 5 wherein:

the rectangular tab portions of the first and second magnetic films are disposed at the corner regions of the films at obtuse angles.

7. A multilayer thin-film magnetic device in accordance with claim 1 wherein:

each of the sides of the first magnetic film is slightly curved, adjacent sides converging to provide tapered-tip tab portions underlying the conducting layer; and each of the sides of the second magnetic film is slightly curved, adjacent sides converging to provide tapered-tip tab portions overlying the conducting layer.

8. A multilayer thin-film magnetic device including:

a first magnetic film having first and second pairs of opposed sides defining first and second pairs of diagonally opposed corner regions and having an easy axis of magnetization at an angle to one of the sides of the film, said first magnetic film including a tab portion at each of the corner regions of one of the pairs of diagonally opposed corner regions, the other one of the pairs of diagonally opposed corner regions lacking tab portions;

a second magnetic film having first and second pairs of opposed sides defining first and second pairs of diagonally opposed corner regions and having an easy axis of magnetization at an angle to one of the sides of the film, said second magnetic film including a tab portion at each of the corner regions of one of the pairs of diagonally opposed corner regions, the other one of the pairs of diagonally opposed corner regions lacking tab portions; and a conducting layer and a smoothing layer disposed between the first and second magnetic films, the first magnetic film being positioned below the conducting layer and the second magnetic film being positioned above the conducting layer;

the tab portions included in the first magnetic film being arranged to extend in a direction away from the conducting layer so as not to underlie the conducting layer and being geometrically shaped whereby parasitic magnetic domains are permitted to form in the film but only in the tab portions and not in the portion of the film underlying the conducting layer; and the tab portions included in the second magnetic film being arranged to extend in a direction away from the conducting layer so as not to overlie the conducting layer and being geometrically shaped whereby parasitic magnetic domains are permitted to form in the film but only in the tab portions and not in the portion of the film overlying the conducting layer.

9. A multilayer thin-film magnetic device including:

a first magnetic film having first and second pairs of opposed sides defining first and second pairs of diagonally opposed corner regions and having an easy axis of magnetization parallel to one of the sides, said first magnetic film including a tab portion at each of the corner regions of one of the pairs of diagonally opposed corner regions, the other one of the pairs of diagonally opposed corner regions lacking tab portions;

a second film having first and second pairs of opposed sides defining first and second pairs of diagonally opposed corner regions and having an easy axis of magnetization parallel to one of the sides, said second magnetic film including a tab portion at each of the corner regions of one of the pairs of diagonally opposed corner regions, the other one of the pairs of diagonally opposed corner regions lacking tab portions; and a conducting layer disposed between the first magnetic film and the second magnetic film, the first magnetic film being positioned below the conducting layer and the second magnetic film being positioned above the conducting layer;

the tab portions included in the first magnetic film being geometrically shaped so as to eliminate nucleation sites for parasitic magnetic domains in the portion of the film underlying the conducting layer thereby preventing the formation of parasitic magnetic domains in the portion of the film underlying the conducting layer; and the tab portions included in the second magnetic film being geometrically shaped so as to eliminate nucleation sites for parasitic magnetic domains in the portion of the film overlying the conducting layer thereby preventing the formation of parasitic magnetic domains in the portion of the film overlying the conducting layer.

10. A multilayer thin-film magnetic device in accordance with claim 9 wherein:

the first magnetic film has a generally parallelogram configuration and the associated tab portions extend in a direction away from the conducting layer so as not to underlie the conducting layer; and the second magnetic film has a generally parallelogram configuration and the associated tab portions extend in a direction away from the conducting layer so as not to overlie the conducting layer.

11. A multilayer thin-film magnetic device in accordance with claim 10 wherein:

the first magnetic film has a generally rectangular configuration and each of the tab portions has a tapered-tip configuration; and the second magnetic film has a generally rectangular configuration and each of the tab portions has a tapered-tip configuration.

12. A multilayer thin-film magnetic device in accordance with claim 10 wherein:

the first magnetic film has a generally rhomboid configuration and each of the tab portions has a tapered-tip configuration; and the second magnetic film has a generally rhomboid configuration and each of the tab portions has a tapered-tip configuration.

13. A multilayer thin-film magnetic device in accordance with claim 10 wherein:

the first magnetic film has a generally rectangular configuration and each of the tab portions has a rectangular configuration, the rectangular tab portions permitting the formation of parasitic magnetic domains in the film but only in the rectangular tab portions and not in the portions of the film underlying the conducting layer; and the second magnetic film has a generally rectangular configuration and each of the tab portions has a rectangular configuration, the rectangular tab portions permitting the formation of parasitic magnetic domains in the film but only in the rectangular tab portions and not in the portion of the film overlying the conducting layer.

14. A multilayer thin-film magnetic device in accordance with claim 13 wherein:

the rectangular tab portions of the first and second magnetic films are disposed at the corner regions of the films at obtuse angles.

15. A multilayer thin-film magnetic device in accordance with claim 9 wherein:

each of the sides of the first magnetic film is slightly curved, adjacent sides converging to provide tapered-tip tab portions underlying the conducting layer; and each of the sides of the second magnetic film is slightly curved, adjacent sides converging to provide tapered-tip tab portions overlying the conducting layer.

16. A multilayer thin-film magnetic device including:

a first magnetic film having first and second pairs of opposed sides defining first and second pairs of diagonally opposed corner regions and having an easy axis of magnetization at an angle to one of the sides of the film, said first magnetic film including a tab portion at each of the corner regions of one of the pairs of diagonally opposed corner regions, the other one of the pairs of diagonally opposed corner regions lacking tab portions;

a second magnetic film having first and second pairs of opposed sides defining first and second pairs of diagonally opposed corner regions and having an easy axis of magnetization at an angle to one of the sides of the film, said second magnetic film including a tab portion at each of the corner regions of one of the pair of diagonally opposed corner regions, the other one of the pairs of diagonally opposed corner regions lacking tab portions; and a conducting layer disposed between the first and second magnetic films, the first magnetic film being positioned below the conducting layer and the second magnetic film being positioned above the conducting layer;

the tab portions included in the first film being arranged to extend in a direction away from the conducting layer so as not to underlie the conducting layer and being geometrically shaped whereby parasitic magnetic domains are permitted to form in the film but only in the tab portions and not in the portion of the film underlying the conducting layer; and the tab portion included in the second magnetic film being arranged to extend in a direction away from the conducting layer so as not to overlie the conducting layer and being geometrically shaped whereby parasitic magnetic domains are permitted to form in the film but only in the tab portions and not in the portion of the film overlying the conducting layer.

* * * * *